(12) United States Patent
Son et al.

(10) Patent No.: US 12,005,901 B2
(45) Date of Patent: Jun. 11, 2024

(54) VEHICLE INCLUDING ELECTRIC MOTOR AND METHOD OF CONTROLLING BRAKE LAMP FOR THE SAME

(71) Applicants: HYUNDAI MOTOR COMPANY, Seoul (KR); KIA MOTORS CORPORATION, Seoul (KR)

(72) Inventors: Hui Un Son, Suwon-si (KR); Seong Wook Moon, Seoul (KR); Song Il Park, Seongnam-si (KR); Sung Bae Jeon, Ansan-si (KR); Sung Hoon Yu, Hwaseong-si (KR); Joon Young Park, Seoul (KR); Chan Ho Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 714 days.

(21) Appl. No.: 16/953,582

(22) Filed: Nov. 20, 2020

(65) Prior Publication Data
US 2021/0171041 A1    Jun. 10, 2021

(30) Foreign Application Priority Data
Dec. 10, 2019  (KR) .......................... 10-2019-0163384

(51) Int. Cl.
*B60W 30/18*    (2012.01)
*B60L 7/26*    (2006.01)
*B60W 10/08*    (2006.01)
*B60W 10/30*    (2006.01)

(52) U.S. Cl.
CPC ......... *B60W 30/18127* (2013.01); *B60L 7/26* (2013.01); *B60W 10/08* (2013.01); *B60W 10/30* (2013.01); *B60L 2240/12* (2013.01); *B60L 2240/423* (2013.01)

(58) Field of Classification Search
None
See application file for complete search history.

(56) References Cited

U.S. PATENT DOCUMENTS

| | | | | |
|---|---|---|---|---|
| 2013/0066493 A1* | 3/2013 | Martin | .................. | B60W 10/06 180/65.265 |
| 2013/0141231 A1* | 6/2013 | Aberizk | .................... | B60L 3/12 340/467 |
| 2014/0379190 A1* | 12/2014 | Sawada | ..................... | B60L 7/14 701/22 |

* cited by examiner

*Primary Examiner* — Todd Melton
*Assistant Examiner* — Jason R Roberson
(74) *Attorney, Agent, or Firm* — MCDONNELL BOEHNEN HULBERT & BERGHOFF LLP

(57) ABSTRACT

A method of controlling a brake lamp of a vehicle including an electric motor as a power source includes determining whether gear shifting is required and whether there is a forward section with a suddenly changing slope when regenerative braking is performed through the electric motor without manipulation of an accelerator pedal or a brake pedal, delaying the gear shifting until the gear shifting exceeds a gear-shifting limit when the gear shifting is required and when there is the forward section with the suddenly changing slope, calculating acceleration based on regenerative braking torque while the gear shifting is delayed, and controlling the brake lamp based on the calculated acceleration.

9 Claims, 5 Drawing Sheets

-Prior Art-

-Prior Art-

VEHICLE INCLUDING ELECTRIC MOTOR AND METHOD OF CONTROLLING BRAKE LAMP FOR THE SAME

CROSS REFERENCE TO RELATED APPLICATIONS

This application claims the benefit of Korean Patent Application No. 10-2019-0163384, filed on Dec. 10, 2019, which is hereby incorporated by reference as if fully set forth herein.

BACKGROUND

Field

The present disclosure relates to a vehicle including an electric motor and a method of controlling a brake lamp for the same, for control of lighting of a brake lamp through regenerative braking in consideration of a slope.

Discussion of the Related Art

Coasting means that a vehicle continuously travels using inertia, whereby the vehicle travels without output of driving force, and in general, coasting refers to driving in a state in which neither an accelerator pedal sensor (APS) nor a brake pedal sensor (BPS) is manipulated.

The torque applied to a drive shaft during coasting may be referred to as inertia torque or coasting torque. In a general internal combustion engine vehicle, idle torque of an engine is also transmitted to a drive shaft through a torque converter and a transmission in a state in which the APS and the BPS are not pressed. This is also referred to as creep torque.

During coasting, this creep torque is transferred to the drive shaft by an engine, and simultaneously, a driving load based on a vehicle speed is applied in the direction opposite to that of the creep torque, and in this regard, coasting torque is configured as the total of the two, which will be described with reference to FIG. 1.

FIG. 1 is a diagram showing an example of the relationship between coasting torque and vehicle speed during coasting of a general vehicle.

Referring to FIG. 1, because a transmission is generally in a low stage in the case of a low vehicle speed, when the speed at an input end of the transmission is lower than an idle RPM of an engine, the idle torque of the engine is transferred, and a vehicle travels forward due to this creep torque. In contrast, because a transmission is in a relatively high stage in the case of a high vehicle speed, when the speed at the input end of the transmission is higher than the idle RPM of the engine, drag based on fuel cut of the engine is transferred, and coasting torque is generated.

Recently, with increased interest in the environment, there has been a great deal of research on hybrid electric vehicles (HEV) and electric motors, which use an electric motor as a driving source.

In a vehicle including such an electric motor, an engine is not present or is not always operating, and thus creep torque from an engine is not generated. However, generally, control is performed to a motor for generating creep torque in order to mimic the characteristics of a general internal combustion engine. Accordingly, in a vehicle including an electric motor, similarly to FIG. 1, forward torque based on idle momentum and the torque-increasing effect of a torque converter of an internal combustion engine in the case of a low speed is illustrated, and reverse torque based on the drag of an engine in which fuel injection is stopped in the case of a high speed is illustrated. Here, the area in which the forward torque appears may be referred to as a creep area, and the area in which the reverse torque appears may be referred to as a coasting area. In this case, the reverse torque may be embodied by regenerative braking.

In a vehicle having an electric motor as a power source, such as a hybrid vehicle (HEV) or an electric vehicle (EV), a motor in addition to a conventional hydraulic friction brake is operated by a generator during braking, and thus, the kinetic energy of a vehicle is converted into electrical energy to thereby enable the vehicle to brake, and this manner of braking is referred to as regenerative braking.

Some currently released eco-friendly vehicles have a function of achieving an interest in driving and simultaneously enhancing real-world fuel efficiency by varying a regenerative braking amount, i.e., a coasting level using a paddle shift lever.

FIG. 2 is a diagram for explaining the concept of a general coasting level.

FIG. 2 shows the relationship between the vehicle speed and the total torque applied to the drive shaft shown in FIG. 1 for each of five different coasting torque courses. In detail, when a regenerative braking amount is increased by one stage by pulling a paddle shift lever once to a side '−', vehicle deceleration is increased, and when a regenerative braking amount is reduced by pulling a paddle shift lever once to a side '+', vehicle deceleration is reduced. Thus, when a coasting level is increased or a vehicle speed is reduced, abrupt deceleration occurs in a vehicle due to regenerative braking.

There is technology that is referred to as one-pedal driving. This is a function that is enabled when an electronic gear shift is positioned at a specific position and by which acceleration and deceleration are adjustable by stepping only on an accelerator pedal without manipulation of a brake pedal, and it is possible to stop a vehicle by completely removing the foot from the accelerator pedal. The present function also uses deceleration through regenerative braking.

However, recently, as the number of vehicles that generate deceleration through regenerative braking, that is, eco-friendly vehicles, has increased, regulations pertaining to illumination of a brake lamp depending on deceleration have been enacted. In detail, according to the clause 5.2.22.4 of the regulation ECE R-13H, in the case of a vehicle employing an electronic regenerative braking device (e-Braking) for generating retarding force when an accelerator pedal is released, it is required to operate (turn on/off) a brake lamp depending on a vehicle deceleration value as defined in Table 1 below.

TABLE 1

| Deceleration | Operation basis | remarks |
|---|---|---|
| deceleration ≤ 0.7 | Not operate | — |
| 0.7 < deceleration ≤ 1.3 | Allow to turn on | Need to turn off before |
| 1.3 < deceleration | Need to turn on | deceleration < 0.7 m/s2 |

The standard for deceleration in the regulations needs to be determined in consideration only of deceleration generated by an electronic regenerative braking apparatus, and in general, deceleration is calculated based on the magnitude of regenerative torque or an acceleration sensor (G sensor) value. However, in the situation in which a vehicle travels on a sloped road such as an uphill or downhill road, acceleration due to the slope that affects the calculation procedure.

For example, when deceleration is determined using the magnitude of regenerative torque, acceleration and deceleration are calculated using "a=F/m where 'a' is acceleration and deceleration of an electronic regenerative braking apparatus, F is the force applied to a wheel during electronic regenerative braking, and m is the mass of a vehicle", but the output torque of a motor and the torque transferred to a wheel may vary due to slippage of engine braking, a gear shifting clutch, or the like. In addition, when acceleration sensor with a filter is used because there is relatively much noise, 10 seconds or more may be required until a detected value is saturated in a section with a suddenly changing slope due to a problem of lag due to the filter.

Accordingly, there is a need for a method of efficiently determining acceleration and deceleration using a pure electronic regenerative braking apparatus in the situation in which a vehicle travels on a sloped road.

SUMMARY

Accordingly, the present disclosure is directed to a vehicle including an electric motor and a method of controlling a brake lamp for the same, for more accurately performing control of a brake lamp based on regenerative braking in the situation in which a vehicle travels on a sloped road.

The technical problems solved by the embodiments are not limited to the above technical problems and other technical problems which are not described herein will become apparent to those skilled in the art from the following description.

To achieve these objects and other advantages and in accordance with the purpose of the disclosure, as embodied and broadly described herein, a method of controlling a brake lamp of a vehicle including an electric motor as a power source includes determining whether gear shifting is required and whether there is a forward section with a suddenly changing slope when regenerative braking is performed through the electric motor without manipulation of an accelerator pedal or a brake pedal, delaying the gear shifting until the gear shifting exceeds a gear-shifting limit when the gear shifting is required and when there is the forward section with the suddenly changing slope, calculating acceleration based on regenerative braking torque while the gear shifting is delayed, and controlling the brake lamp based on the calculated acceleration.

The method may further include performing the gear shifting when the gear shifting exceeds the gear-shifting limit, simultaneously correcting an acceleration value of an acceleration sensor using acceleration calculated based on the regenerative braking torque when the gear shifting begins, and controlling the brake lamp based on the corrected acceleration.

In another aspect of the present disclosure, a vehicle including an electric motor includes the electric motor configured to provide regenerative braking force, and a controller, wherein the controller determines whether gear shifting is required and whether there is a forward section with a suddenly changing slope when regenerative braking is performed through the electric motor without manipulation of an accelerator pedal or a brake pedal, delays the gear shifting until the gear shifting exceeds a gear-shifting limit when the gear shifting is required and when there is the forward section with the suddenly changing slope, calculates acceleration based on regenerative braking torque while the gear shifting is delayed, and controls the brake lamp based on the calculated acceleration.

In another aspect of the present disclosure, a vehicle including an electric motor includes the electric motor configured to provide regenerative braking force, and a controller, wherein the controller determines whether gear shifting is required and whether a vehicle speed is greater than a preset threshold speed when regenerative braking is performed through the electric motor without manipulation of an accelerator pedal or a brake pedal, delays the gear shifting until the gear shifting exceeds a gear-shifting limit when the gear shifting is required and when the vehicle speed is greater than the preset threshold speed, calculates acceleration based on regenerative braking torque while the gear shifting is delayed, and controls a brake lamp based on the calculated acceleration.

BRIEF DESCRIPTION OF THE FIGURES

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
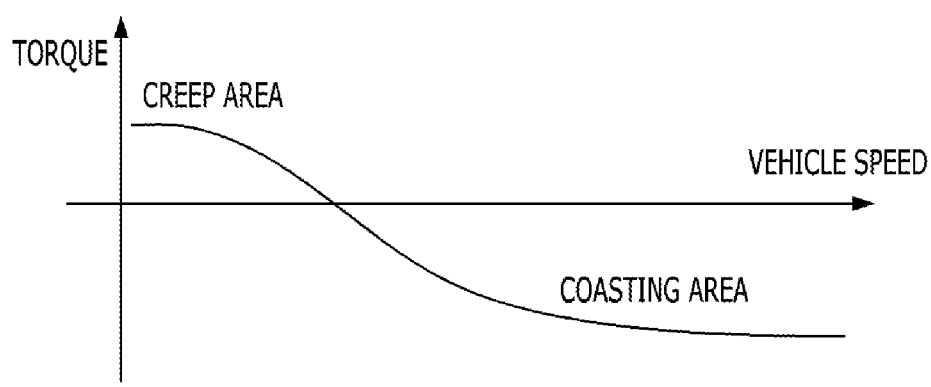
FIG. 1 is a diagram showing an example of the relationship between coasting torque and vehicle speed during coasting of a general vehicle.
Figure 2:
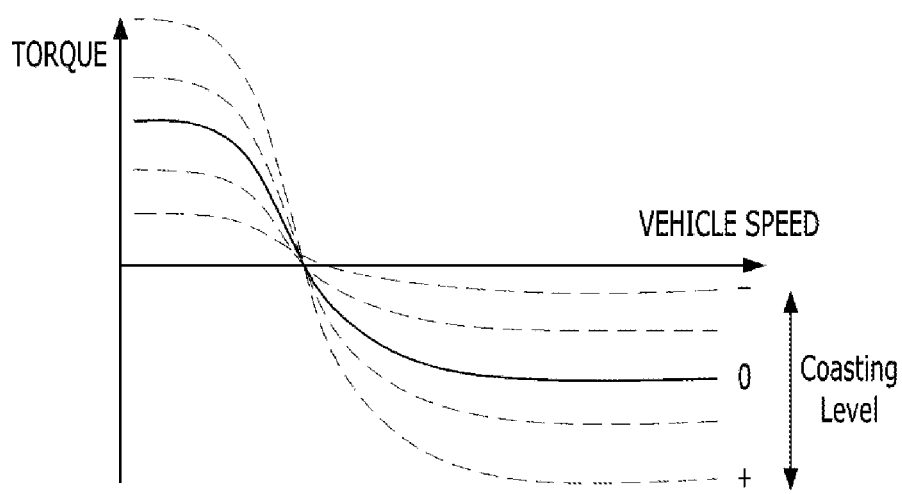
FIG. 2 is a diagram for explaining the concept of a general coasting level.

Hereinafter, the embodiments of the present disclosure will be described in detail with reference to the accompanying drawings so as to be easily implemented by those skilled in the art. However, the present disclosure may be variously implemented, and is not limited to the embodiments described herein. In the drawings, in order to clearly describe the present disclosure, portions which are not related to the description of the present disclosure will be omitted, and similar portions are denoted by similar reference numerals throughout the specification.

Throughout the specification, when a certain portion is said to "include" a certain component, this does not indicate that other components are excluded, and the same may be further included unless specifically described to the contrary.

The same reference numbers will be used throughout the drawings to refer to the same or like parts.

As described above, a method of calculating acceleration through regenerative torque is relatively free from a problem of filtering lag due to noise but has a problem in reliability in the situation in which motor torque and wheel torque are different, such as engine braking operation or gear shifting. In addition, a method of calculating the acceleration of an acceleration sensor is relatively free from influence due to engine braking or gear shifting, but a lag phenomenon occurs in a situation with a suddenly changing slope due to the influence of noise on a filter.

Accordingly, an embodiment of the present disclosure provides a method of calculating acceleration through regenerative torque while gear shifting is delayed during regenerative braking and calculating acceleration by correcting an acceleration sensor value when a gear-shifting delay limit is reached if a sloped road that satisfies a predetermined condition is present ahead.

Prior to a detailed description of a method of calculating acceleration according to embodiments of the present disclosure, the configuration of a vehicle applicable to the embodiments will be described.

Figure 3:
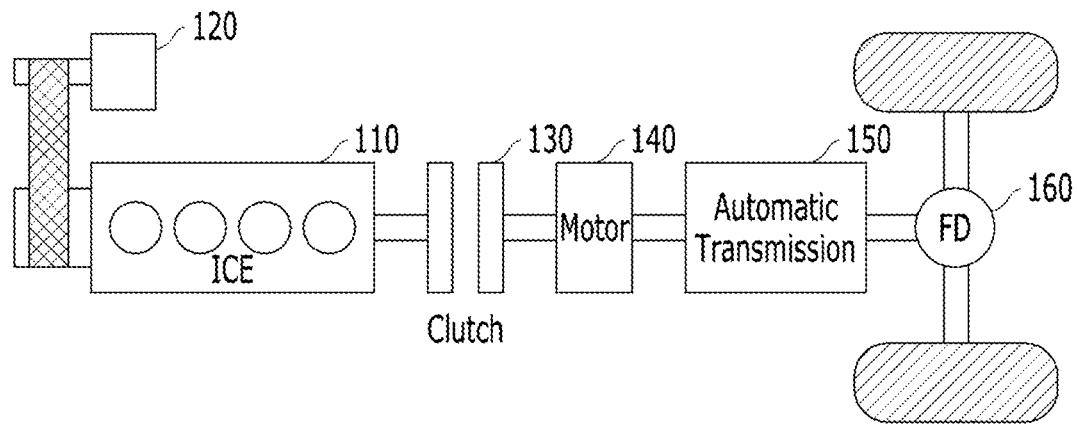
FIG. 3 is a diagram illustrating an example of the structure of a powertrain of a conventional hybrid vehicle applicable to embodiments of the present disclosure.

FIG. 3 is a diagram illustrating an example of the structure of a powertrain of a conventional hybrid vehicle applicable to embodiments of the present disclosure.

Referring to FIG. 3, the powertrain of the hybrid vehicle adopts a parallel-type hybrid system, in which an electric motor (or a drive motor) 140 and an engine clutch 130 are mounted between an internal combustion engine (ICE) 110 and a transmission 150.

In the vehicle, when a driver presses an accelerator after starting the vehicle (i.e. the accelerator pedal position sensor on mode), the motor 140 is first driven using the electric power of a battery in the state in which the engine clutch 130 is opened, and the wheels are moved by the power transferred to a final drive (FD) 160 via the transmission 150 from the motor (i.e. an EV mode). When a greater driving force is required as the vehicle gradually accelerates, the ICE 110 may be driven by operating an auxiliary motor (or a starter and generator motor) 120.

Thus, when the number of revolutions per minute of the ICE 110 and the number of revolutions per minute of the motor 140 are equal to each other, the engine clutch 130 is engaged so that so that the vehicle is driven by both the ICE 110 and the motor 140 (i.e. transition from the EV mode to an HEV mode). When a predetermined engine off condition, such as deceleration of the vehicle, is satisfied, the engine clutch 130 is opened and the ICE 110 is stopped (i.e. transitioning from the HEV mode to the EV mode). In this case, a battery 170 is charged through the motor 140 using the driving force of the wheels in the vehicle, which is referred to as braking energy regeneration or regenerative braking. Accordingly, the starter and generator motor 120 serves as a starter motor when the engine is started, and also serves as a generator when the rotational energy of the engine is recovered after the vehicle is turned on or when the vehicle is turned off. Therefore, the starter/generator motor 120 may be referred to as a hybrid starter generator (HSG).

In general, the transmission 150 may use a stepped transmission or a multi-plate clutch, e.g., a dual clutch transmission (DCT).

Needless to say, the configuration of the powertrain shown in FIG. 3 is an example of a component of a vehicle including an electric motor and enabling regenerative braking but the present disclosure is not limited thereto, and thus it will be obvious to one of ordinary skill in the art that the present embodiment is applicable to a series/parallel type hybrid system, an electric vehicle without an engine, or the like.

Figure 4:
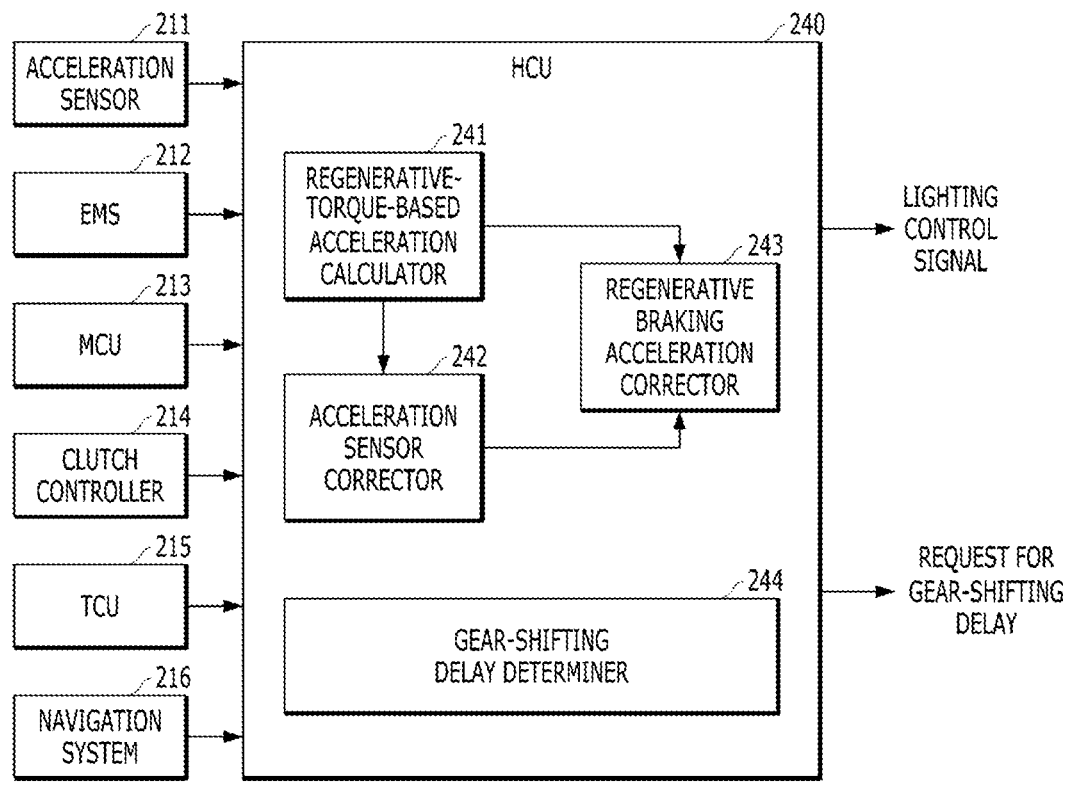
FIG. 4 is a diagram showing an example of the configuration of a hybrid vehicle according to an embodiment of the present disclosure.

Hereinafter, the configuration of a controller according to an embodiment will be described with reference to FIG. 4. FIG. 4 is a diagram showing an example of the configuration of a hybrid vehicle according to an embodiment of the present disclosure.

Referring to FIG. 4, the hybrid vehicle according to the present disclosure may include an acceleration sensor 211, an engine management system (EMS) 212 for controlling the ICE 110, a motor control unit (MCU) 213, a clutch controller 214 for controlling the engine clutch 130, a transmission control unit (TCU) 215 for controlling the transmission 150, a navigation system 216, and a hybrid controller 240.

The acceleration sensor 211 may provide the sensed acceleration value, and may be included in an electronic postural control system (e.g., an electronic safety program (ESP)), but the present disclosure is not limited thereto.

The EMS 212 may provide information on a vehicle speed, and the MCU 213 may provide a regenerative braking torque value. The clutch controller 214 may provide information on the state (i.e., an engine clutch state) of a hydraulic clutch actuator (i.e., hydrostatic clutch actuator (HCA)) for changing the state of the engine clutch 130. The TCU 215 may provide information on a gear-shifting state, such as a current gear stage or whether gear shifting is required, and the navigation system 216 may provide information on the slope of a forward path.

The hybrid controller 240 may include a regenerative-torque-based acceleration calculator 241 for calculating acceleration based on the regenerative torque information provided by the MCU 213, an acceleration sensor corrector 242 for correcting the acceleration value provided by the acceleration sensor 211, a regenerative braking acceleration corrector 243 for determining the final acceleration to be applied to control of lighting of a brake lamp based on the acceleration calculated by the regenerative-torque-based acceleration calculator 241 and the corrected acceleration value provided by the acceleration sensor corrector 242, and a gear-shifting delay determiner 244 for determining a gear-shifting delay up to a gear-shifting limit on a sloped road having a suddenly changing slope.

Hereinafter, the operation of each component of the hybrid controller 240 will be described in more detail.

The regenerative-torque-based acceleration calculator 241 may calculate acceleration using the law of physics about acceleration as follows.

First, the acceleration 'a' from regenerative braking may be obtained by dividing the force F applied to a wheel by the mass 'm' of a vehicle. Here, the mass 'm' may be a predetermined value based on data of the vehicle and may be calculated based on acceleration compared with output of the vehicle. The force F may be a value obtained by dividing a wheel torque T by the dynamic radius of a tire, and the dynamic radius of the tire may be obtained by referring to a value that is stored in advance based on data of the vehicle. The wheel torque T may be a value obtained by multiplying the regenerative braking torque of a motor by a gear ratio 'r' corresponding to the current stage of the transmission 150 again.

In other words, the acceleration through regenerative braking may be obtained by dividing the output torque (i.e., wheel torque) obtained through the regenerative torque and the gear ratio by the dynamic radius of the wheel to calculate the force transferred to the wheel and dividing the force by the mass of the vehicle again. In this case, in order to reduce an error due to engine braking and to maximize a regeneration amount, the regenerative-torque-based acceleration calculator 241 may check the state of the engine clutch 130 through the clutch controller 214 during regenerative braking and may request the clutch controller 214 to release the engine clutch when the engine clutch is engaged.

The acceleration sensor corrector 242 may correct a value detected by the acceleration sensor 211 using the acceleration of the regenerative-torque-based acceleration calculator 241 in the situation in which the acceleration of the regenerative-torque-based acceleration calculator 241 is not definite, such as a gear-shifting situation.

In detail, the acceleration sensor corrector 242 may simultaneously correct the value of the acceleration sensor 211 when gear shifting begins, and may correct an initial slope detected by the acceleration sensor 211 using the acceleration calculated by the regenerative-torque-based acceleration calculator 241 to minimize a lag phenomenon. For example, the acceleration detected by the acceleration sensor 211 on a sloped road may be the sum of acceleration through regenerative braking and acceleration (g sin $\theta_{slope}$ where g is gravitational acceleration and $\theta_{slope}$ is a slope) due to a slope. Thus, a sine sin $\theta_{slope,initial}$ of an initial slope may be a value obtained by dividing a value, obtained by subtracting the acceleration through regenerative braking from the acceleration detected by the acceleration sensor, by gravitational acceleration.

The regenerative braking acceleration corrector 243 may apply the acceleration calculated by the regenerative-torque-based acceleration calculator 241 until the gear-shifting delay determiner 244 delays gear shifting in the situation in which a slope suddenly changes, and when gear shifting begins, the regenerative braking acceleration corrector 243 may determine the final acceleration to be applied to control of lighting of a brake lamp using the corrected acceleration of the acceleration sensor corrector 242. In situations other than the situation in which a slope suddenly changes, the regenerative braking acceleration corrector 243 uses the acceleration value of the acceleration sensor 211, but the present disclosure is not limited thereto.

When detecting a sudden change of a slope ahead through the navigation system 216, the gear-shifting delay determiner 244 may determine whether to delay gear shifting based on a vehicle speed and a current gear stage, may make a request to the TCU 215 for gear-shifting delay when it is determined to delay gear-shifting delay, and may notify the regenerative braking acceleration corrector 243 of the same. As described above, regenerative torque-based acceleration calculation is inaccurate during gear shifting, and thus the value of the acceleration sensor 211 needs to be used, but the value may also be inaccurate in the case of a suddenly changing slope. Accordingly, when a change in a slope ahead in information on a slope of the navigation system 216 is greater than a preset threshold value and it is determined that gear shifting is not capable of finishing prior to a forward section with a changing slope based on the remaining distance and the vehicle speed until the slope suddenly changes, gear-shifting delay may be requested, and the acceleration value calculated by the regenerative-torque-based acceleration calculator 241 may be used by the regenerative braking acceleration corrector 243. A detailed example of this control will be described with reference to FIG. 5.

Figure 5:
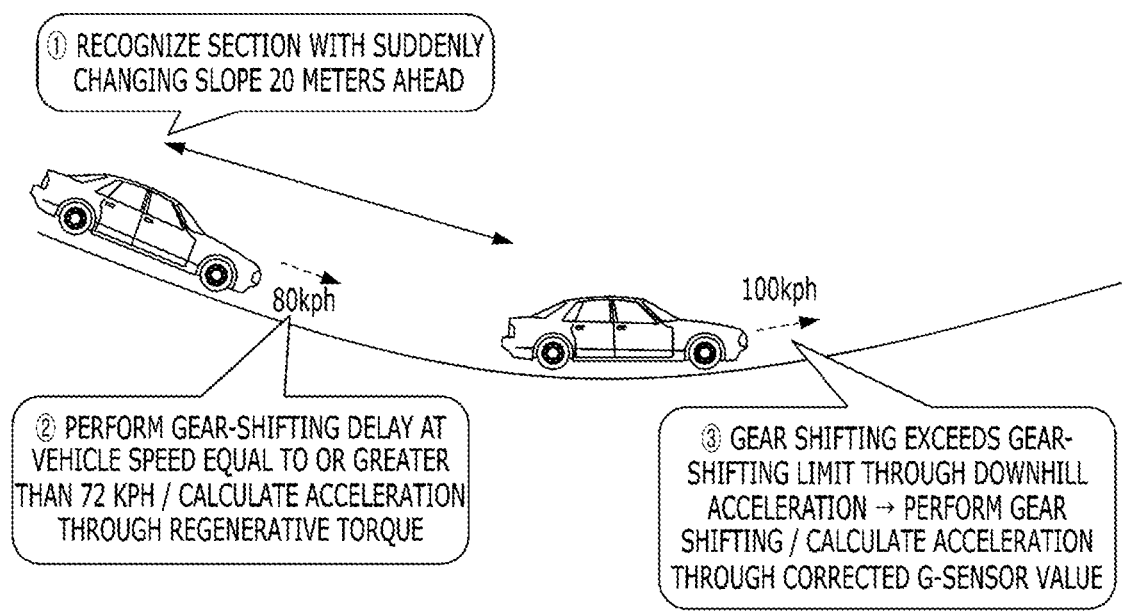
FIG. 5 is a diagram showing an example of the form of acquisition of acceleration through regenerative braking through recognition of a section with a suddenly changing slope by a hybrid vehicle according to an embodiment of the present disclosure.

FIG. 5 is a diagram showing an example of the form of acquisition of acceleration through regenerative braking through recognition of a section with a suddenly changing slope by a hybrid vehicle according to an embodiment of the present disclosure.

Referring to FIG. 5, the gear-shifting delay determiner 244 may delay gear shifting when the current vehicle speed is greater than '72 kph (=20 m/s)–α' when the time taken for gear shifting is 1 second in the situation in which a section with a suddenly changing slope is recognized 20 meters ahead based on the information on the slope of the navigation system 216. Here, α is a margin for a speed change. In other words, when the current vehicle speed is greater than a value obtained by subtracting the margin from 72 kph at the current time, gear shifting is not capable of finishing before the section with a suddenly changing slope is reached, and thus, when this continues without change, an acceleration value of the regenerative-torque-based acceleration calculator 241 is inaccurate in the section with a suddenly changing slope due to gear shifting, and the current situation refers to the situation in which a lag phenomenon is also predicted in the acceleration of the acceleration sensor 211. In order to prevent this situation, the gear-shifting delay determiner 244 may determine that gear shifting is not capable of finishing prior to the section with a suddenly changing slope, and may determine gear-shifting delay because the vehicle speed is 80 kph.

However, when gear shifting exceeds a gear-shifting limit due to acceleration down a hill, the gear-shifting delay determiner 244 may determine to shift gears, and thus the regenerative braking acceleration corrector 243 may simultaneously apply the corrected acceleration value of the acceleration sensor corrector 242 as the final acceleration when gear shifting begins.

For example, when an EV mode is adopted due to reduction in the torque requested by a driver in the situation in which there is no pedal manipulation and the engine clutch 130 is released, there is no gear-shifting limit for deceleration, but when a vehicle accelerates when traveling on a downhill road, if a vehicle speed reaches the highest RPM compared with the gear ratio of the current gear stage, upshifting needs to be performed. In more detail, even if regenerative braking is operated in the situation in which a transmission is in a first stage on a steep downhill road, when the vehicle accelerates and the vehicle speed exceeds 40 kph, gear shifting may exceed 6000 rpm, which is the maximum RPM of a motor. In this case, it is deemed that gear shifting exceeds a gear-shifting limit and upshifting needs to be performed.

Figure 6:
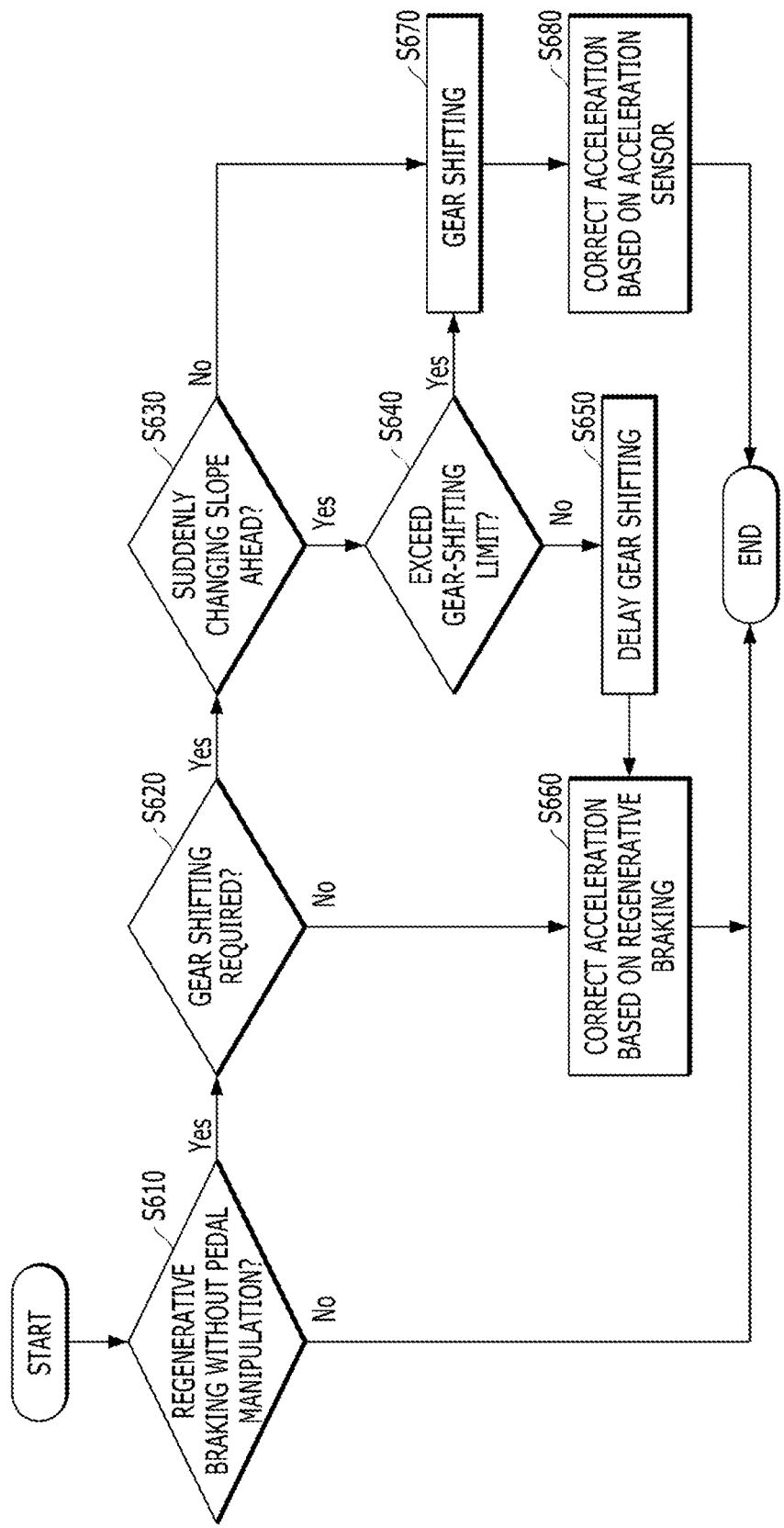
FIG. 6 is a flowchart of an example of a procedure of acquiring acceleration through regenerative braking by a hybrid vehicle according to an embodiment of the present disclosure.

The procedure of determining acceleration according to the embodiment described thus far is summarized in the flowchart of FIG. 6.

FIG. 6 is a flowchart of an example of a procedure of acquiring acceleration through regenerative braking by a hybrid vehicle according to an embodiment of the present disclosure.

Referring to FIG. 6, when regenerative braking begins at S610 without pedal manipulation (i.e., e-braking) (S610), the hybrid controller 240 may determine whether gear shifting is required at S620. Whether gear shifting is required may be determined by first determining whether gear shifting is required by inserting an APS value and a vehicle speed to a preset transmission map by the TCU 215 and determining whether a request for gear shifting of the TCU 215 is received by the hybrid controller 240, but the present disclosure is not limited thereto.

When gear shifting is not required (NO of S620), a regenerative torque-based acceleration may be applied to control of a brake lamp at S660.

In contrast, when gear shifting is required (YES of S620) and a slope suddenly changes ahead based on information on a map of the navigation system 216 (YES of S630), the hybrid controller 240 may request the TCU 215 to delay gear shifting at S650 and may control a brake lamp using acceleration of regenerative torque while gear shifting is delayed at S660 until gear shifting exceeds a gear-shifting limit (NO of S640). In this case, whether a slope suddenly changes may be determined by comparing the sum of variations of a slope per unit distance with a preset reference for increasing lag of the acceleration sensor 211, but the present disclosure is not limited thereto.

When there is no sudden change in slope (NO of S630) or a vehicle speed is greater than a gear-shifting limit (YES of S640), gear shifting may be performed at S670, and an acceleration value, obtained by correcting the initial slope of the acceleration sensor 211 to the regenerative torque-based acceleration, may be simultaneously applied to control of a brake lamp when gear shifting begins at S680.

According to another embodiment of the present disclosure, when information on a slope ahead is not capable of being acquired, for example, when there is no navigation update or a vehicle travels in a GPS shadow, whether to perform gear shifting may be determined based on a vehicle speed.

Even if there is a section with a suddenly changing slope ahead, when a vehicle speed is very low, variation in the slope per unit time may be very small. Thus, even if gear shifting is performed and the corrected value of the acceleration sensor 211 is used, the error due to a lag phenomenon is negligible, and thus the value of the acceleration sensor 211 may be reliable. Thus, there is only an upper limit for upshifting through acceleration while a vehicle travels in an EV mode, and thus, since this situation occurs only at a comparatively high speed, deceleration due to air resistance is important, and even if regenerative torque through regenerative braking (e-Braking) is reduced, driving characteristics are not greatly adversely affected. Thus, a brake lamp may not be operated when reducing regenerative torque through regenerative braking, which will be described with reference to FIG. 7.

Figure 7:
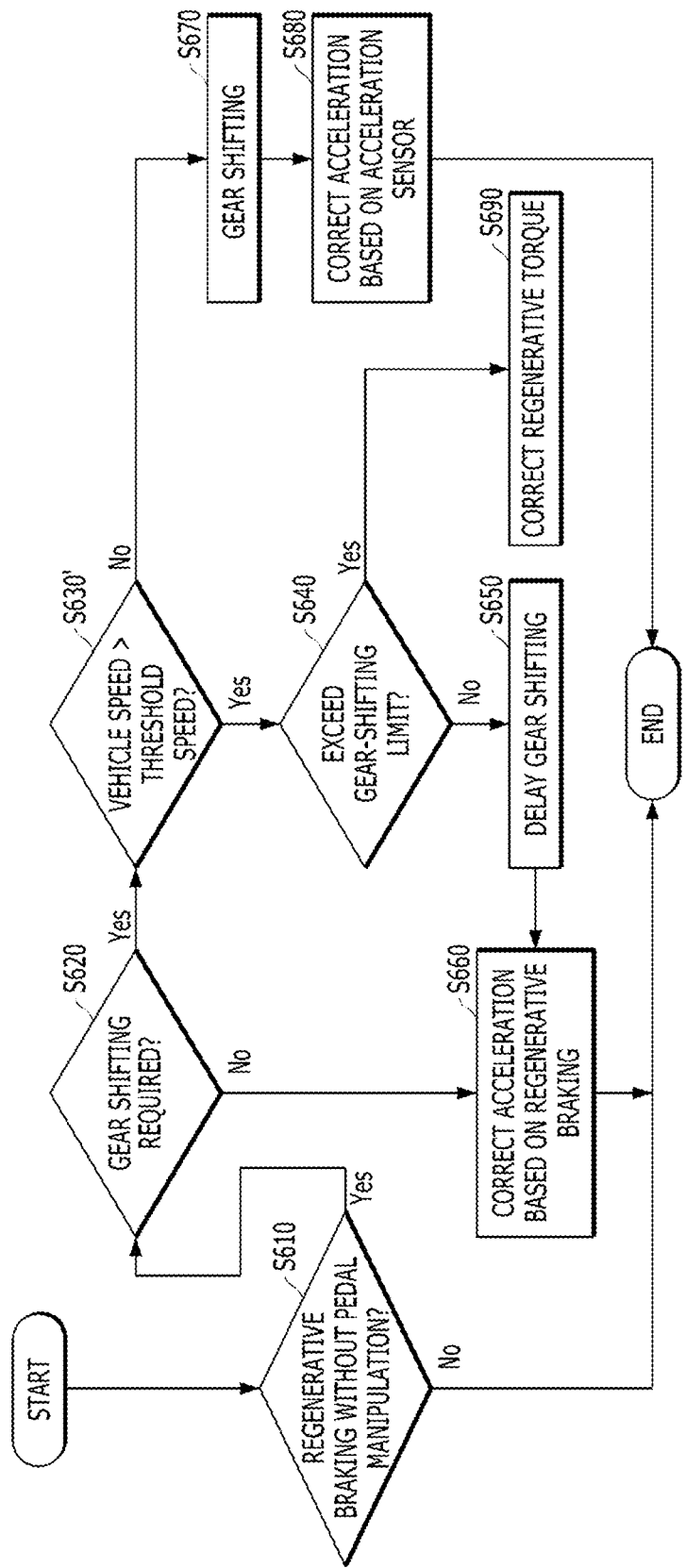
FIG. 7 is a flowchart showing an example of a procedure of acquiring acceleration through regenerative braking by a hybrid vehicle according to another embodiment of the present disclosure.

FIG. 7 is a flowchart showing an example of a procedure of acquiring acceleration through regenerative braking by a hybrid vehicle according to another embodiment of the present disclosure.

FIG. 7 is the same as FIG. 6 except that operation S630 of FIG. 6 is replaced with operation S630' of comparing a vehicle speed with a threshold speed and that operation S690 of correcting regenerative torque when gear shifting exceeds a gear-shifting limit is newly added, and thus repeated descriptions are omitted and FIG. 7 will be described in terms of differences from FIG. 6.

First, in operation S630', whether the vehicle speed is greater than a preset threshold speed may be determined. In this case, the threshold speed may be determined as a value (e.g., an experimental value) by which lag at a predetermined level or less occurs in a value detected by the acceleration sensor 211 even in a section with a suddenly changing slope.

When gear shifting exceeds a gear-shifting limit in operation S640 (YES of S640), a hybrid controller may perform correction to reduce regenerative torque (e.g., correction to 0) at S690. As described above, this method is a control method of preventing a brake lamp from being turned on due to regenerative braking, rather than accurately calculating acceleration through regenerative braking by lowering regenerative braking torque.

According to the aforementioned embodiments, the reliability of correction of acceleration through a downhill during regenerative braking (e-Braking) without pedal manipulation may be improved so as to effectively satisfy the regulations, and a brake lamp may be appropriately operated, and information about whether a foregoing vehicle is decelerating may be transferred to a driver of a following vehicle, thereby enhancing the safety and marketability of vehicles.

A vehicle related to the embodiment of the present disclosure as configured above may correct an acceleration value based on acceleration calculated based on regenerative braking torque and acceleration detected by an acceleration sensor, and thus an acceleration-based brake lamp control may be more accurately performed.

It will be appreciated by persons skilled in the art that that the effects that could be achieved with the present disclosure are not limited to what has been particularly described hereinabove and other advantages of the present disclosure will be more clearly understood from the detailed description.

The disclosure can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method of controlling a brake lamp of a vehicle having an electric motor as a power source, the method comprising:
   determining whether gear shifting is required and whether there is a forward section with a slope that is greater than a preset threshold value when regenerative braking is performed through the electric motor without manipulation of an accelerator pedal or a brake pedal;
   delaying the gear shifting until a gear-shifting limit is exceeded when the gear shifting is required, and when there is the forward section with the slope;
   calculating acceleration based on regenerative braking torque while the gear shifting is delayed; and
   controlling the brake lamp based on the calculated acceleration;
   wherein whether the gear shifting limit is exceeded is determined based on a vehicle speed, a gear ratio of a current gear stage, and a maximum number of revolutions per minute of a motor.

2. The method of claim 1, further comprising:
   performing the gear shifting when the gear-shifting limit is exceeded;
   correcting an acceleration value of an acceleration sensor using acceleration calculated based on the regenerative braking torque when the gear shifting begins; and
   controlling the brake lamp based on the corrected acceleration.

3. The method of claim 2, wherein the correcting comprises:

calculating an initial slope using the acceleration calculated based on the regenerative braking torque; and
correcting the acceleration value of the acceleration sensor using the initial slope.

4. The method of claim 1, wherein the delaying comprises:
determining whether gear shifting is completed up to the forward section with the slope based on a remaining distance and a vehicle speed up to the forward section with the slope, and a time taken to shift gears; and
when gear shifting is not capable of being completed, delaying the gear shifting.

5. A non-transitory computer-readable recording medium having recorded thereon a program for executing the method of claim 1.

6. A vehicle comprising:
an electric motor configured to provide regenerative braking force; and
a controller;
wherein the controller is configured to:
determine whether gear shifting is required and whether there is a forward section with a slope that is greater than a preset threshold value when regenerative braking is performed through the electric motor without manipulation of an accelerator pedal or a brake pedal;
delay the gear shifting until the gear shifting exceeds a gear-shifting limit when the gear shifting is required and when there is the forward section with the slope;
calculate acceleration based on regenerative braking torque while the gear shifting is delayed; and
control the brake lamp based on the calculated acceleration;
wherein the controller is further configured to determine whether the gear-shifting limit is exceeded based on a vehicle speed, a gear ratio of a current gear stage, and a maximum number of revolutions per minute of a motor.

7. The vehicle of claim 6, wherein the controller is further configured to:
allow the gear shifting when the gear-shifting limit is exceeded;
correct an acceleration value of an acceleration sensor using acceleration calculated based on the regenerative braking torque when the gear shifting begins; and
control the brake lamp based on the corrected acceleration.

8. The vehicle of claim 7, wherein the controller is further configured to calculate an initial slope using the acceleration calculated based on the regenerative braking torque, and correct the acceleration value of the acceleration sensor using the initial slope.

9. The vehicle of claim 6, wherein the controller is further configured to determine whether gear shifting is completed up to the forward section with the slope based on a remaining distance and a vehicle speed up to the forward section with the slope, and a time taken to shift gears, and when the gear shifting is not capable of being completed, the controller is configured to delay the gear shifting.

* * * * *